United States Patent

Noteware et al.

(10) Patent No.: US 9,225,953 B2
(45) Date of Patent: Dec. 29, 2015

(54) SYSTEM AND METHOD FOR LOCALLY RECORDING AUDIO FROM A VIDEO CONFERENCE

(71) Applicant: NextGen Reporting, Wayne, PA (US)

(72) Inventors: David Noteware, Bryn Mawr, PA (US); Jonathan De Jong, East Norriton, PA (US)

(73) Assignee: NextGen Reporting, Wayne, PA (US)

( * ) Notice: Subject to any disclaimer, the term of this patent is extended or adjusted under 35 U.S.C. 154(b) by 168 days.

(21) Appl. No.: 14/058,350

(22) Filed: Oct. 21, 2013

(65) Prior Publication Data

US 2015/0110297 A1    Apr. 23, 2015

(51) Int. Cl.
*H04B 1/00* (2006.01)
*H04N 9/802* (2006.01)
*H04N 7/15* (2006.01)

(52) U.S. Cl.
CPC .............. *H04N 9/802* (2013.01); *H04N 7/155* (2013.01)

(58) Field of Classification Search
None
See application file for complete search history.

(56) References Cited

U.S. PATENT DOCUMENTS

2005/0180341 A1* 8/2005 Nelson et al. ............... 370/260
2008/0113326 A1* 5/2008 Wakamoto ................. 434/319

* cited by examiner

Primary Examiner — Thang Tran
(74) Attorney, Agent, or Firm — Novak Druce Connolly Bove + Quigg LLP

(57) ABSTRACT

A system and method for recording a video conference between a home location and at least one remote location. The method includes: receiving a first audio signal from a computer at the home location, the first audio signal including the audio feed of the video conference participant from the at least one remote location; feeding the first audio signal to (a) a sound producing device, and (b) a mixing device; receiving a second audio signal from a microphone at the home location, the second audio signal including an audio feed from the microphone; feeding the second audio signal to (a) an audio input of the computer at the home location and (b) the mixing device; combining, at the mixing device, the first and second audio signals into a third signal, wherein the third signal includes the audio feed from the microphone and the at least one remote location; outputting the third audio signal; and recording the outputted third audio signal on a recording device.

19 Claims, 7 Drawing Sheets

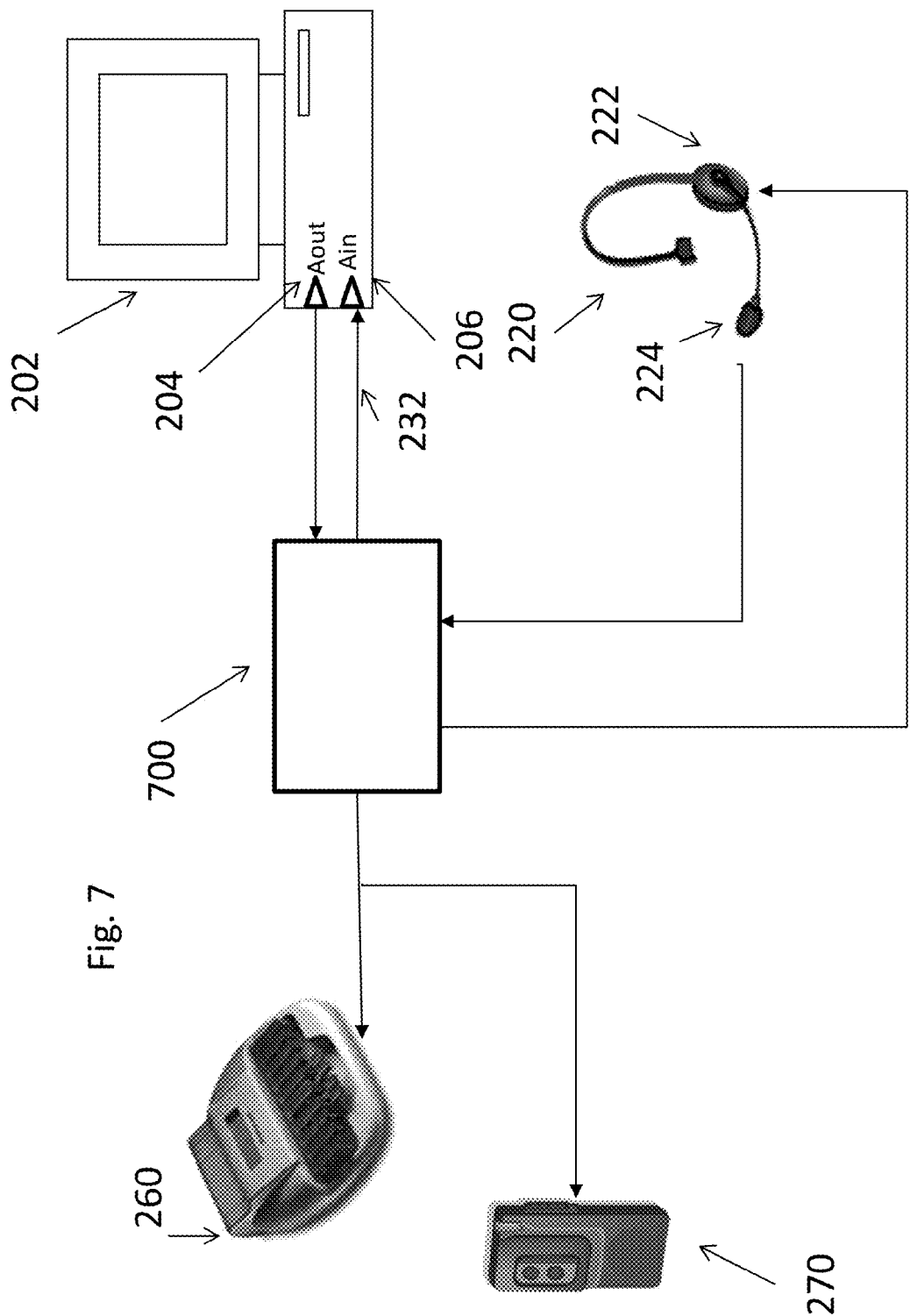

SYSTEM AND METHOD FOR LOCALLY RECORDING AUDIO FROM A VIDEO CONFERENCE

FIELD OF THE INVENTION

The various embodiments described herein relate generally to locally recording audio from a video conference. More specifically, embodiments of the invention relate to audio recording for video conference court reporting services provided via a remote court reporter.

BACKGROUND

A court reporter is a person whose occupation is to transcribe spoken or recorded speech into written form. The services of court reporters are typically used to transcribe testimony in legal proceedings, such as depositions attendant to litigation. For purposes of brevity, discussion is herein limited to depositions, although it is to be understood that the invention is not so limited to any particular environment.

Human speech typically includes more words per minute than a typical person could write or type, which precluded transcription into English. So called "shorthand" is a written format that uses symbols or abbreviations instead of letters, and for which the transcriber (referred to herein as a stenographer) can transcribe at a speed that equals human speech. Court reporters use a specialized typewriter called a stenotype machine to type in shorthand. The written product appears as a foreign language to those unfamiliar with it, and the court reporter will later have to provide a written product readable English. This final written product is known as a written transcript.

The court reporter is typically present in the room with the individuals that will be the subject of the transcript. The court reporter listens to the conversations in the room and types what each person says using the stenotype machine. The court reporter is also an active participant in the conversation, and will transcribe his or her own speech as they would any other participant in the room.

Accuracy of the final transcript is of paramount importance. The court reporter will therefore record the conversation through a tape recorder. Later, when preparing the final transcript, the court reporter plays back the recorded conversation to confirm what was said and that the final transcript is accurate. Modern stenotype machines also have an audio recording feature that synchronizes the conversation with the typed shorthand, which has proven a valuable tool in streamlining the translation and editing process. The synchronization has become industry standard and is effectively a requirement of the transcription process.

In recent years, attempts have been made to conduct depositions through video conferencing. This not only spares the participants from the burden of travel, but the court reporter does not need to be physically present with the participants. This allows the parties to access a court reporter in remote areas, as well hire a court reporter at a lower hourly rate from a less expensive geographic area.

A problem with depositions by video conference is that the quality of the audio from the video conference as recorded in the stenotype machine is inferior to an in-person deposition. This makes it more difficult for the court reporter to rely upon the recording to edit and confirm the accuracy of the transcript.

This problem is discussed with respect to FIG. 1, which shows a set up for a court reporter (not shown) to transcribe the audio of a video conference. The court reporter is located at a home location at 100, and the other participants are located at one or more remote locations, generally shown by 120.

At home location 100, a computer 102 that supports video conference software is connected to a network, and conducts the video conference in a well-known manner. The court reporter listens to the audio 106 of the remote participants to the video conference through the computer speakers 104 (shown as independent and external to computer 102, although they could be internal speakers) of computer 102.

As noted above, the court reporter is an active participant to the conversation, and that voice must be included in the recording in the stenotype machine 112. The court reporter must therefore use a separate microphone 108 and position it at the workstation so it can receive both the video conference audio 106 from the computer speaker 104, as well as the court reporter's voice (shown as audio 110). The captured audio is then stored in stenographic machine 112 in synchronization with the court reporter's typing. The captured audio may also be stored in one or more backup recording devices 114.

The audio as stored in the stenographic machine 112 in synchronization with the court reporter's typing is of lower quality as compared to an audio recorded in an in-person live deposition. Several factors contribute to this inferior quality. First, the audio of the remote participants as received by computer 102 must first be converted to audio 106 and then recorded by microphone 108; the audio signal->speaker->microphone->audio signal conversion introduces a natural degradation in quality (a "picture of a picture"). Second, microphone 108 is located a distance from the speakers 104 and the court reporter; such distance naturally reduces the quality of the recording. Third, microphone 108 can also capture other ambient sounds 118; this can be problematic if several court reporters at a service center are located in close proximity to each other.

Various video conference applications have a built in recording feature that produces a recorded version of the conference call on completion. However, the copy is not synchronized with the stenotype machine, and thus of limited value to the court reporter.

BRIEF DESCRIPTION OF THE DRAWINGS

Various embodiments in accordance with the present disclosure will be described with reference to the drawings, in which:

FIG. 7 illustrates another embodiment of the invention.

SUMMARY OF THE INVENTION

Figure 1:
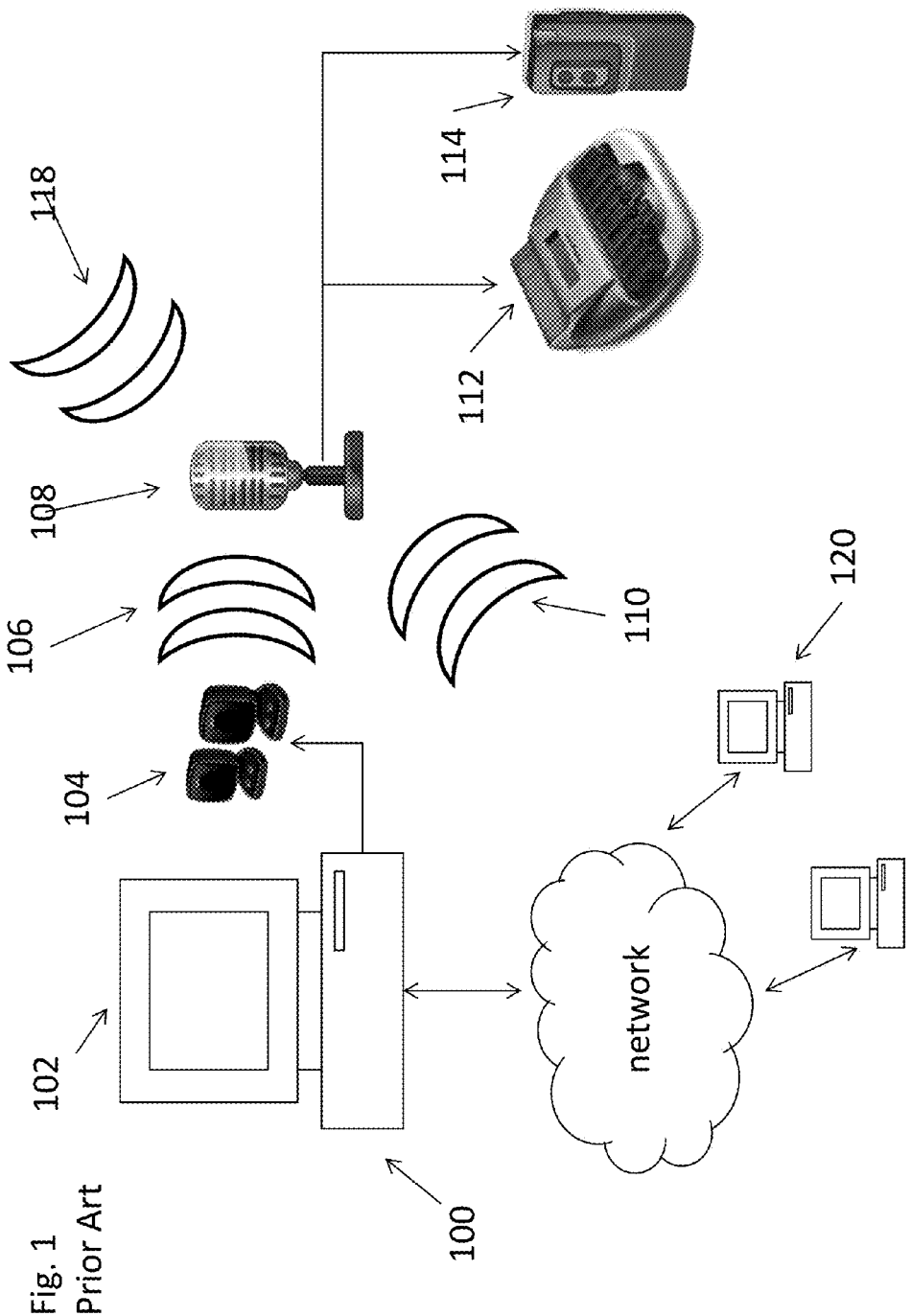
FIG. 1 illustrates a prior art methodology for a video conference court reporter station.

A system and method for recording a video conference between a home location and at least one remote location. The method includes: receiving a first audio signal from a computer at the home location, the first audio signal including the audio feed of the video conference participant from the at least one remote location; feeding the first audio signal to (a)

a sound producing device, and (b) a mixing device; receiving a second audio signal from a microphone at the home location, the second audio signal including an audio feed from the microphone; feeding the second audio signal to (a) an audio input of the computer at the home location and (b) the mixing device; combining, at the mixing device, the first and second audio signals into a third signal, wherein the third signal includes the audio feed from the microphone and the at least one remote location; outputting the third audio signal; and recording the outputted third audio signal on a recording device.

The above embodiment may have various optional features. The recording device may be a stenotype machine, the method further comprising synchronizing in near real time the third audio signal with typing on the stenotype machine. The sound producing device and the microphone may be integral components of a headset. The mixing device may be a mixer. Feeding the first audio signal may include creating two version of the first audio signal, and sending one version to the sound producing device and other version to the mixing device. Feeding the second audio signal may include creating two versions of the second audio signal, and sending one version to the audio input of the computer and other version to the mixing device. The creating may include splitting. The first, second and third audio signals may be analog signals. The first, second and third audio signals may each be an analog signal or a digital signal.

According to another embodiment of the invention, a method for recording a video conference between a home location and at least one remote location is provided. The method includes: receiving a first audio signal from an audio output of a computer at the home location, the first audio signal including the audio feed of the video conference from the at least one remote location; generating second and third audio signals from the first audio signal; providing the second audio signal to a sound producing device; providing the third audio signal to a mixing device; receiving a fourth audio signal from a microphone at the home location, the fourth signal including an audio feed from the microphone; generating fifth and sixth audio signals from the fourth audio signal; providing the fifth audio signal to an audio input of the computer at the home location; providing the sixth audio signal to the mixing device; combining, at the mixing device, the first and sixth audio signals into a seventh audio signal, wherein the seventh audio signal includes the audio feed from the microphone the audio feed of the video conference from the at least one remote location; and outputting the seventh audio signal to a recording device.

The above embodiment may have various optional features. The generating second and third audio signals may include splitting the first audio signal into the second and the third audio signals. The generating fifth and sixth audio signals may include splitting the fourth audio signal into the fifth and the sixth audio signals. The first, second, third, fourth, fifth, sixth and seventh audio signals may be analog signals. The first, second, third, fourth, fifth, sixth and seventh audio signals may each be analog or digital signals. The sound producing device and the microphone may be integral components of a headset. The recording device may be a stenotype machine, the method further including synchronizing in near real time the seventh audio signal with typing on the stenotype machine.

According to yet another embodiment of the invention, an apparatus for recording a video conference is provided. A computer has video conference capability, and audio input and an audio output. A mixer, a headset, and a recording device connected to an output of the mixer are provided. A first splitter connects as follows: (a) an input to an audio output of the computer, (b) a first output to the mixer, (c) a second output to headphone of the headset. A second splitter connects as follows: (a) an input to a microphone of the headset, (b) a first output to the mixer, and (c) a second output to the audio input of the computer. The mixer is configured to (a) combine the audio output of the computer with the audio output of the microphone, and (b) output the combined audio to the recording device.

The above embodiment may have various features. When the videoconference is active, the headset may communicates with the computer through the first and second splitters, whereby the headset provides audio participation in the video conference, and the mixer outputs the combined audio feed of all participants to the video conference.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Figure 2:
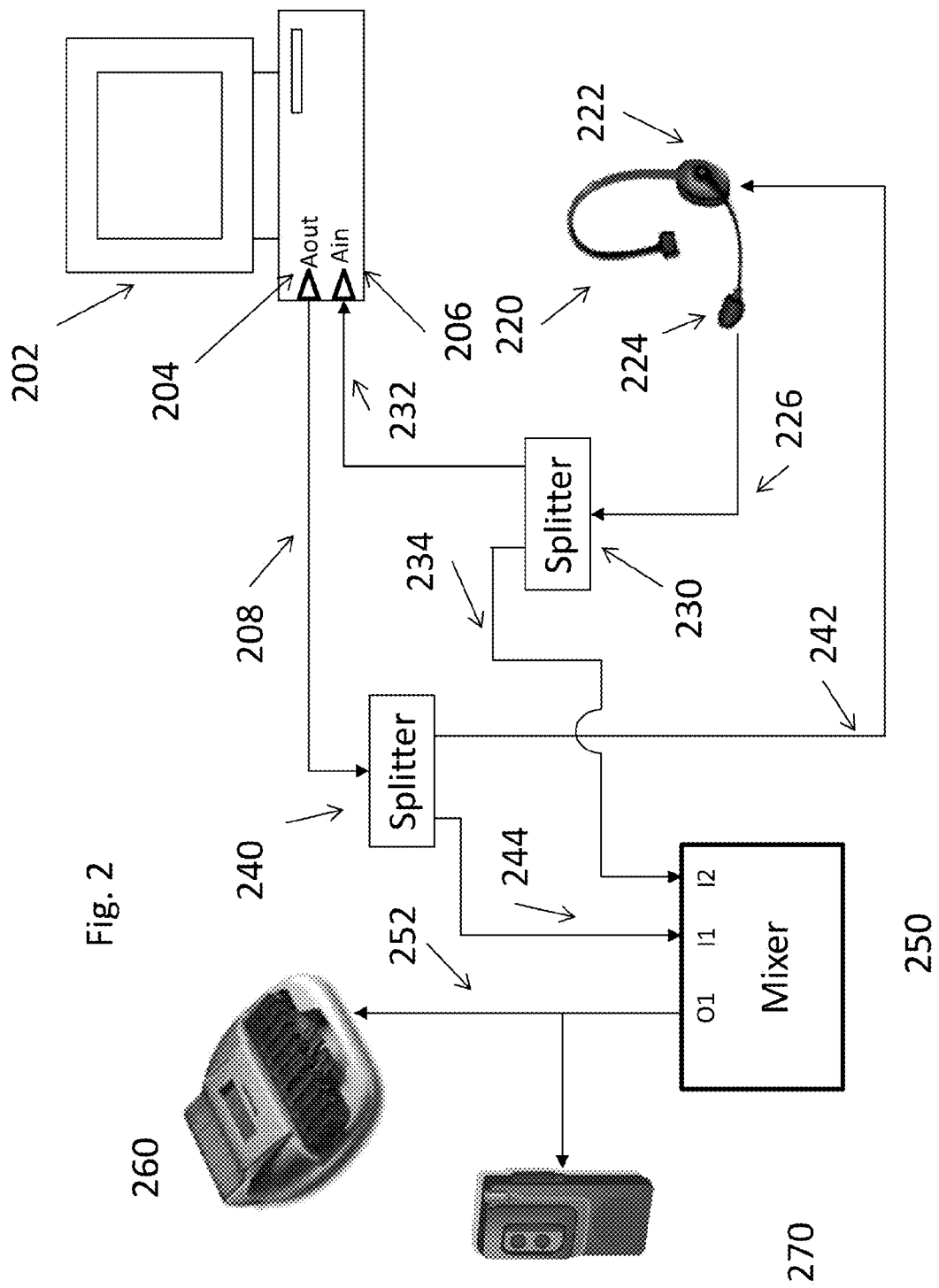
FIG. 2 illustrates an embodiment of the invention.

Referring now to FIG. 2, an audio recording environment at a home location 200 is shown. A computer 202 is the court reporter's computer through which the video conference is held. Computer 202 includes all components that are typical of computer systems, including processor, memory, keyboard, mouse, display, modem, supporting software, etc. The invention is not limited to any particular type of computer setup, distribution of the components, and/or location of the components relative to the recording environment. Computer 202 supports software to conduct video conferencing over a network.

Computer 202 preferably can output audio signals through an analog audio jack for an external speaker (e.g., a standalone speaker such as speaker 104, or a headphone), referred to herein as audio output 204. Similarly, computer 202 preferably can receive analog audio signals through an analog microphone jack, and this is referred to herein as audio input 206. The structure and operation of these components are well known in the art of computers and not discussed further herein.

The court reporter is preferably provided with a speaker and microphone, distinct from any corresponding built in speakers and microphone of computer 202, to conduct the video conference. Preferably this is part of an integrated headset 220 that includes a headphone 222 and an attached microphone 224 that are adjacent the court reporter's ear(s) and mouth.

In the embodiment of FIG. 2, headset 220 may be an analog audio headset, and thus has independent connection cables for receiving audio at headphone 222 and sending audio from microphone 224. However, the embodiment is not limited to analog headsets. By way of example, there are digital headsets which include an appropriate sound card that converts the analog audio into digital, such that the analog pathways do not extend directly to microphone 224 and headphone 222. In either case, any recitation of receiving or sending analog audio signals from/to the headset, a connection of analog cables to the headset, is to include the above scenarios, and/or any other headsets that may communicate in part with analog signals.

Microphone 224 connects via a pathway 226 to an input of a first splitter 230. First splitter 230 is configured to receive the audio signal from microphone 224 and create two output signals having the same content as the received microphone audio signal (although possibly at a different power level and/or with additional signal degradation). One of the two output signals is sent via pathway 232 to audio input 206 of computer 202. The other of the two output signals is sent via pathway 234 to an input of a mixer 250. For purposes of nomenclature, the two output signals may be considered the same as the input signal (including and subject to possible power level loss and/or signal degradation).

Audio output 204 of computer 202 connects via pathway 208 to the input of a second splitter 240. Second splitter 240 is configured to receive the audio signal from computer 202 and create two output signals having the same content as the received computer audio signal (although possibly at a different power level and/or with additional signal degradation). One of the two output signals is sent via pathway 242 to headphone 222. The other of the two output signals is sent via pathway 244 to an input of mixer 250. For purposes of nomenclature, the two output signals may be considered the same as the input signal (including and subject to possible power level loss and/or signal degradation).

Mixer 250 combines the two audio signals from first splitter 230 and second splitter 240 using known techniques. Mixer 250 then outputs via pathway 252 the combined audio signal to stenotype machine 260. Mixer 250 can also output the combined audio signal to one or more backup recording devices 270.

Operation of the above design will now be discussed with reference to FIGS. 3-6.

Figure 3:
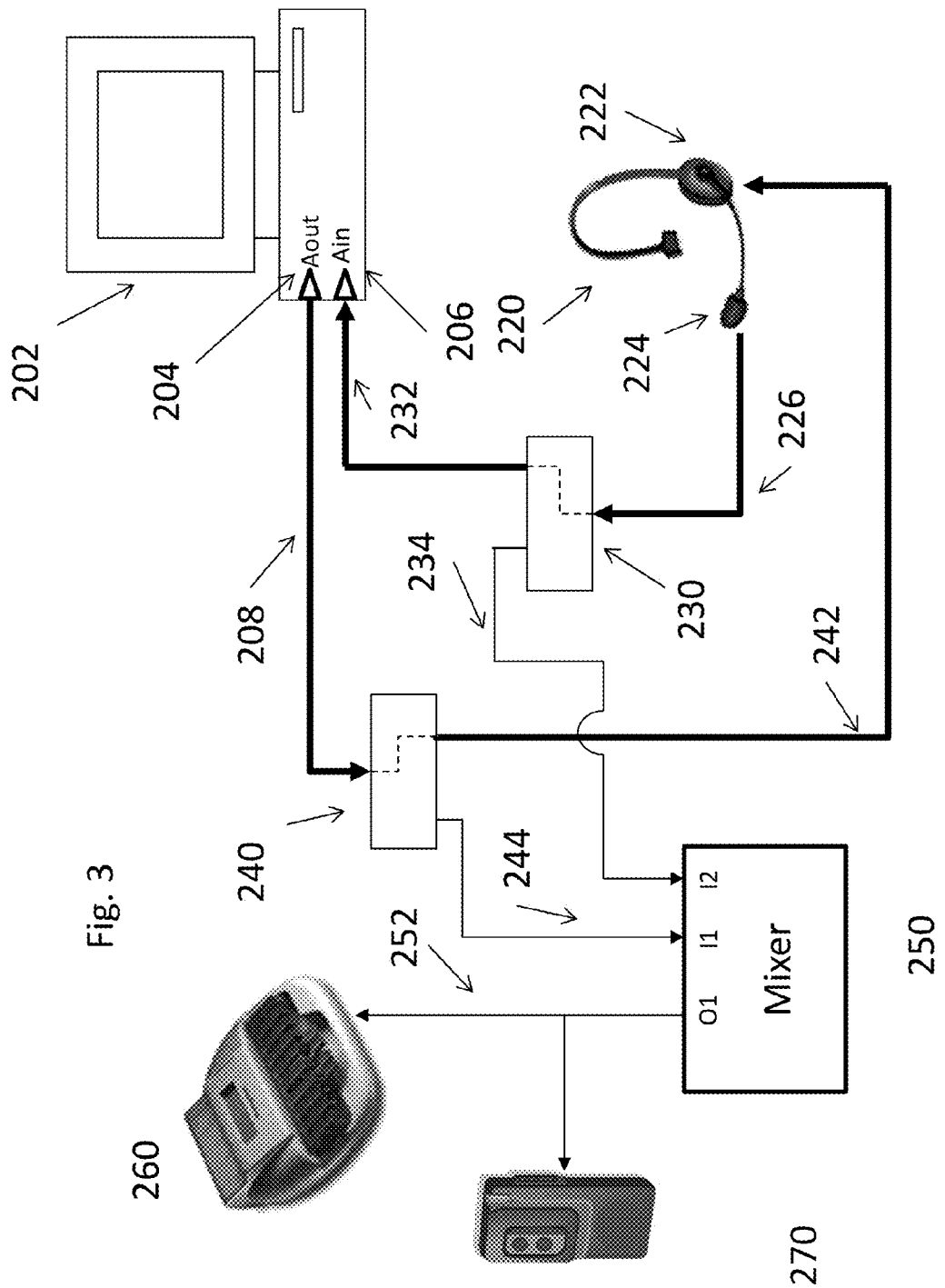
FIG. 3 illustrates the embodiment of FIG. 2 with certain pathways enhanced for clarity

FIG. 3 shows the architecture of FIG. 2, although certain pathways have been made thicker to highlight the pathways under discussion, and specifically the pathways for participation by the court reporter in the video conference.

Figure 4:
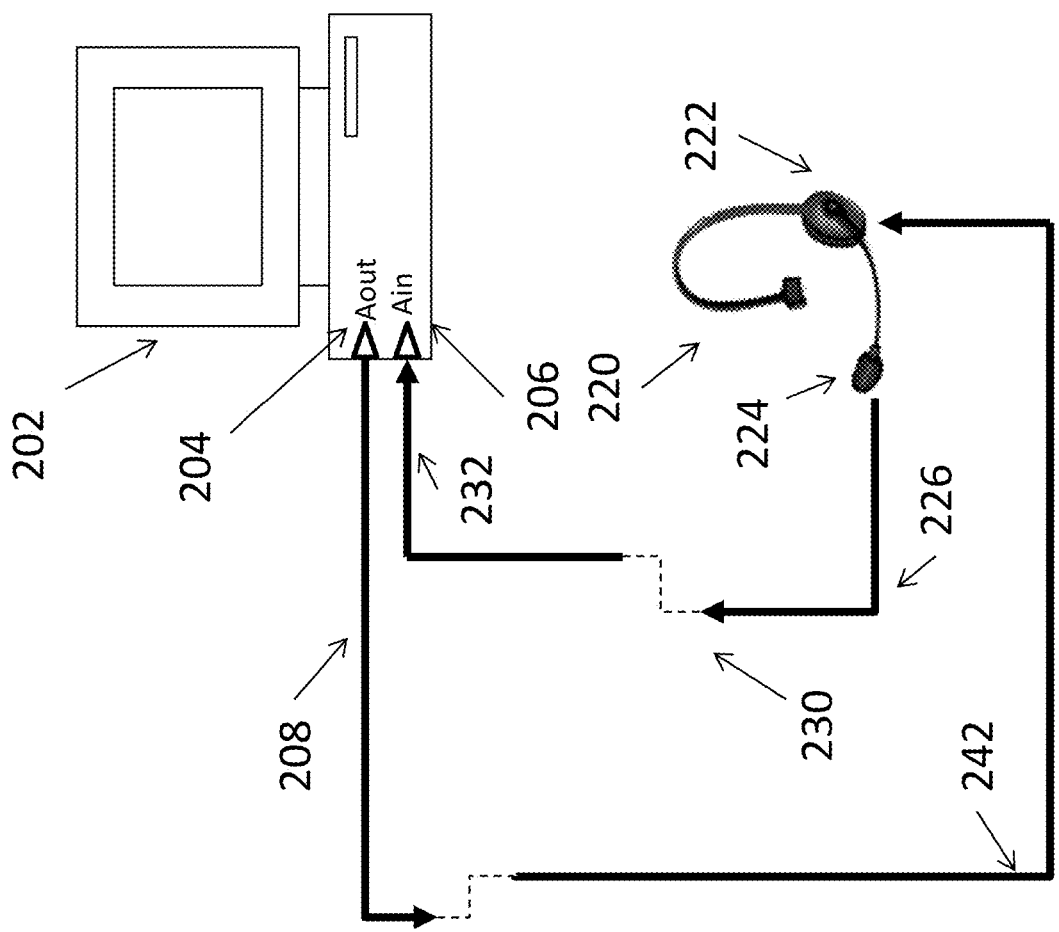
FIG. 4 illustrates the embodiment FIG. 2, with certain pathways and components removed for clarity.

As shown in FIG. 3, headset 220 connects through the splitters 230/240 to the audio ports of computer 202. The relationship is also shown in FIG. 4, which corresponds to FIG. 3 with non-involved components removed. The court reporter can thus participate directly in the video conference through headset 220, as opposed to computer speakers 104 and microphone 108 in prior art FIG. 1.

This architecture provides significant improvements over the prior art, as follows.

First, the court reporter can hear the video conference better, which can improve the accuracy of the initial transcription. As is known in the art, audio emerging from headphones is much clearer than computer speakers. In the prior art of FIG. 1, the court reporter could not use headphones with the computer 102 because the resulting setup would unacceptably prevent the stenograph machine from recording the court reporter's voice. The architecture of FIG. 2 does not have this limitation, and the court reporter is free to use headphones (either alone or as part of an integral headset 220 with integrated microphone 224).

Second, the headset microphone 224 allows for clearer reception of the court reporter's voice by virtue of proximity to the mouth as compared to the centrally located microphone 108 of the prior art; the court report's voice will thus be clearer in the video conference and the recorded audio. Also, as is known in the art, microphone 224 as found in headset 220 is less sensitive to ambient noise, and as such less ambient noise will inject into the video conference and/or the recordings.

Figure 5:
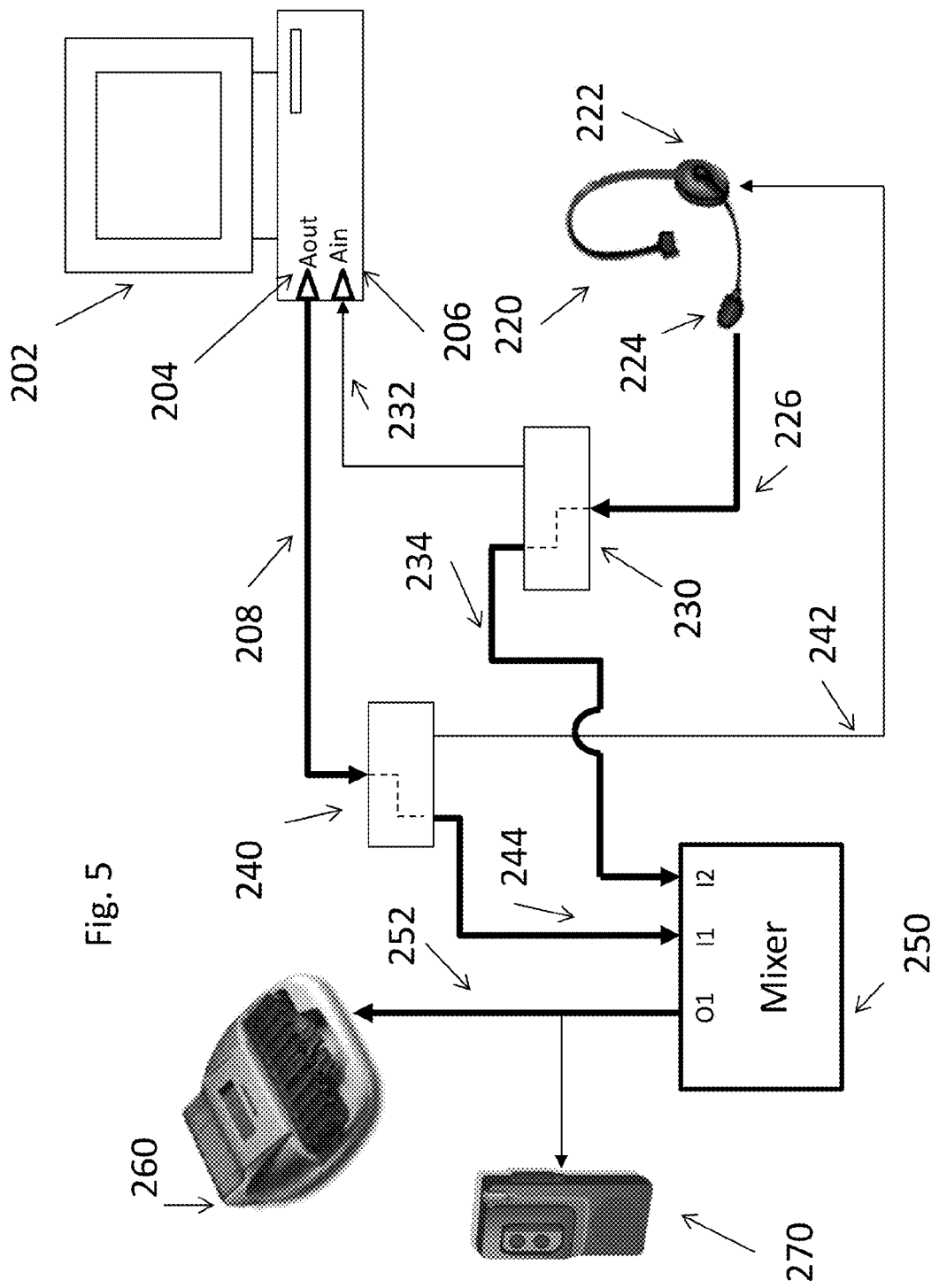
FIG. 5 illustrates the embodiment of FIG. 2, with certain pathways enhanced for clarity.
Figure 6:
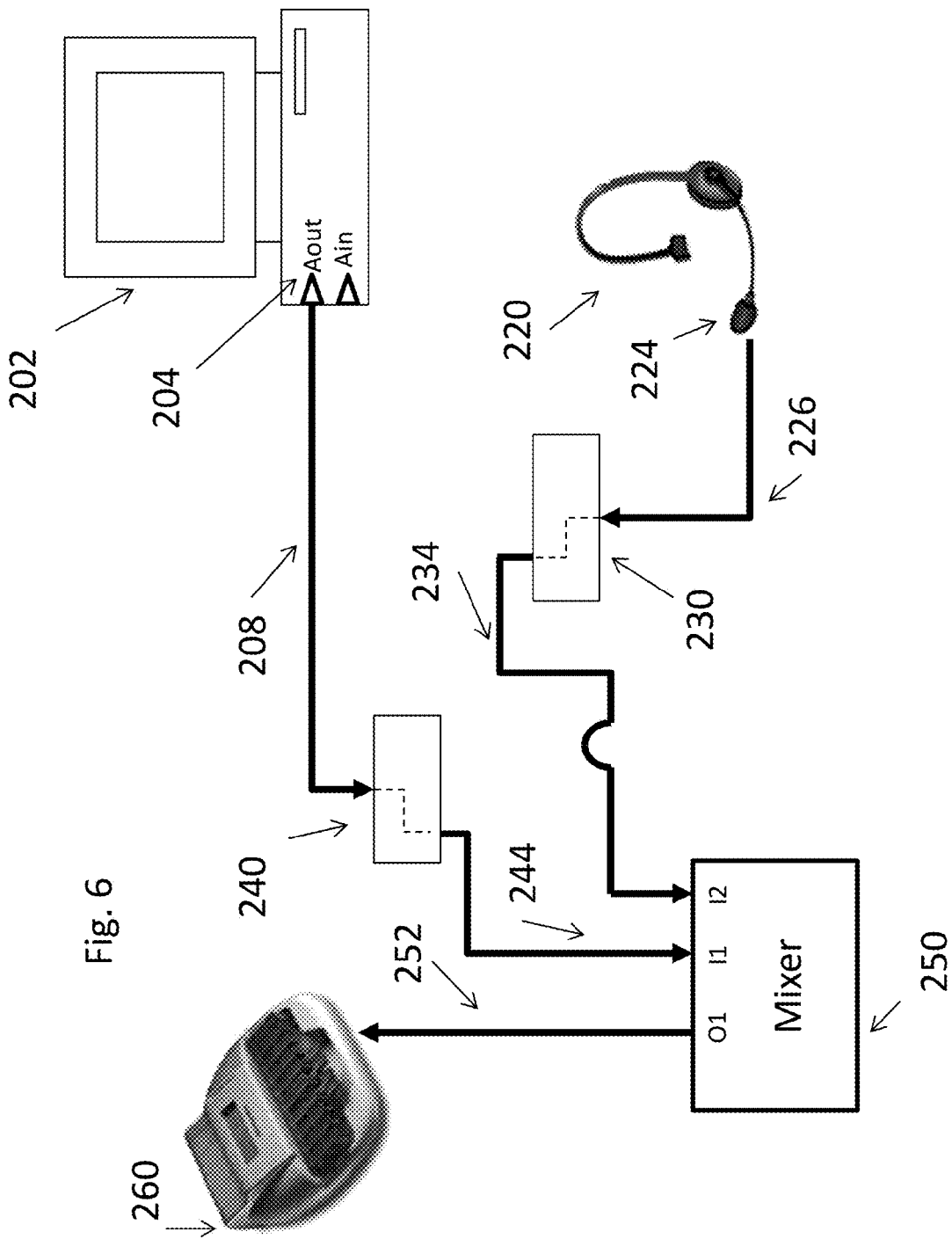
FIG. 6 illustrates the embodiment of Fig, with certain pathways and components removed for clarity.

Whereas FIGS. 3 and 4 focus on the court reporter's involvement in the video conference, FIGS. 5 and 6 focus on recording the video conference on stenograph machine 260. FIG. 5 shows the architecture of FIG. 2, although certain pathways have been made thicker to highlight the pathways under discussion, and specifically the pathways for recording the video conference.

As shown in FIG. 5, mixer 250 receives the court reporter's voice from microphone 224 via pathway 226, first splitter 230, and pathway 234. Mixer 250 also receives the audio of the remote participants from audio output 204 of computer 202 via pathway 208, second splitter 240, and pathway 244. The relationship is shown in FIG. 6, which corresponds to FIG. 5 with non-involved components removed.

As shown in FIGS. 2, 5 and 6, mixer 250 receives audio signals for everyone involved in the video conference, and specifically (a) the court reporter from microphone 224 and (b) all of the remote participants via the audio output 204 of computer 202. Using known techniques, mixer 250 combines the two audio signals into one common signal that includes audio for all participants; the mixer may add them equally or unequally as desired for best balance of the audio. This combined audio signal is output via pathway 252 to stenograph machine 260, and possibly additional recording devices 270. The mixer may optionally apply various processing to the signals, such as filtering, balancing, etc.

This architecture provides significant improvements over the prior art, as follows.

As is known in the art, an audio signal directly from the analog audio output of the computer 102 is much clearer for recording purposes as compared to outputting the audio signal through a speaker and recording it through a microphone. The prior art of FIG. 1 did not allow the court reporter to record the original audio signal of the remote participants of the video conference because this would unacceptably prevent the stenograph machine from recording the court reporter's voice; thus the transformation from audio signal->speaker output->microphone input->lower quality audio signal was required. The architecture of FIG. 2 does not have this limitation, and the audio signal from computer 202 (subject to intermediate processing, such as splitting and combining with the audio signal for the court reporters voice) can be recorded without such a transformation.

The embodiment of FIG. 2 has an additional advantage in that all of the components are "off the shelf" components. No specialized computer skills or engineering skills are necessary to purchase and connect the components. No custom components are necessary, and the entire device (not including the computer 202) can be purchased and assembled for less than $500. No software changes need to be made to the video conferencing software.

According to another embodiment of the invention, the various components and connections could be incorporated into one or more off the shelf or custom housings. By way of non-limiting example, FIG. 7 shows, a converter 700 that includes the splitting and mixing functionality discussed with respect to splitters 230 and 240, as well as mixer 250. The internals of converter 700 may be an analog hardware implementation consistent with the components as discussed herein.

Although the embodiment discussed above with respect to FIG. 2 relates to analog signals, the invention is not so limited. Digital signals and corresponding equipment may also be used. By way of non-limiting example, optical signals could be used, in which the various described components are optical versions, e.g., optical splitters and headsets.

Combinations of digital and optical could also be used. By way of non-limiting example, computer 202 could communicate through analog, and the splitters contain a combination of hardware and/or software that convert the analog to digital signals to be sent to a digital headset 220 and/or or digital mixer 250. The splitting itself may instead of a pure split be a passage of the original signal plus a replication, or two replications of the original signal. Splitter 230/240 and mixer 250 may be traditionally components that are understood by those names in commerce, or may be more generic components that effectuate the function of splitting or mixing in other manners and using other types of hardware and/or software components.

The various connection herein may be direct or indirect. By way of non-limiting example, splitter 230 may be connected directly to mixer 250 directly as shown in FIG. 2. However such connection may be through an intermediate component.

Further, minor variations in the signals induced by any such indirect components (e.g. power levels, minor distortions, filtering) that do not significantly affect the substantive content of the spoken voices of the participants as recorded are within the scope of the connections. By way of non-limiting example, splitter 230 can be considered to feed the signal from audio out 204 to mixer 250. However placing a filter between splitter 230 and mixer 250 (e.g., to remove background static or sounds from frequencies outside of spoken language) may slightly alter the audio signal such that the signal as fed from splitter 230 is not exactly the signal received at mixer 250. For purposes of the application, since the substantive content of the spoken voices of the participants is not substantively effected, this is still considered to feed the signal from audio out 204 to mixer 250, notwithstanding the intervening component and the minor change that the filter created.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for recording a video conference between a home location and at least one remote location, the method comprising:
   receiving a first audio signal from a computer at the home location, the first audio signal including the audio feed of the video conference participant from the at least one remote location;
   feeding the first audio signal to (a) a sound producing device, and (b) a mixing device;
   receiving a second audio signal from a microphone at the home location, the second audio signal including an audio feed from the microphone;
   feeding the second audio signal to (a) an audio input of the computer at the home location and (b) the mixing device;
   combining, at the mixing device, the first and second audio signals into a third signal, wherein the third signal includes the audio feed from the microphone and the at least one remote location;
   outputting the third audio signal; and
   recording the outputted third audio signal on a recording device.

2. The method of claim 1, wherein the recording device is a stenotype machine, the method further comprising synchronizing in near real time the third audio signal with typing on the stenotype machine.

3. The method of claim 1, wherein the sound producing device and the microphone are integral components of a headset.

4. The method of claim 1, wherein the mixing device is a mixer.

5. The method of claim 1, wherein the feeding the first audio signal comprises creating two version of the first audio signal, and sending one version to the sound producing device and other version to the mixing device.

6. The method of claim 5, wherein the creating comprises splitting.

7. The method of claim 1, wherein the feeding the second audio signal comprises creating two versions of the second audio signal, and sending one version to the audio input of the computer and other version to the mixing device.

8. The method of claim 7, wherein the creating comprises splitting.

9. The method of claim 1, wherein the first, second and third audio signals are analog signals.

10. The method of claim 1, wherein the first, second and third audio signals are each an analog signal or a digital signal.

11. A method for recording a video conference between a home location and at least one remote location, the method comprising:
    receiving a first audio signal from an audio output of a computer at the home location, the first audio signal including the audio feed of the video conference from the at least one remote location;
    generating second and third audio signals from the first audio signal;
    providing the second audio signal to a sound producing device;
    providing the third audio signal to a mixing device;
    receiving a fourth audio signal from a microphone at the home location, the fourth signal including an audio feed from the microphone;
    generating fifth and sixth audio signals from the fourth audio signal;
    providing the fifth audio signal to an audio input of the computer at the home location;
    providing the sixth audio signal to the mixing device;
    combining, at the mixing device, the third and sixth audio signals into a seventh audio signal, wherein the seventh audio signal includes the audio feed from the microphone the audio feed of the video conference from the at least one remote location; and
    outputting the seventh audio signal to a recording device.

12. The method of claim 11, wherein the generating second and third audio signals comprises splitting the first audio signal into the second and the third audio signals.

13. The method of claim 11, wherein the generating fifth and sixth audio signals comprises splitting the fourth audio signal into the fifth and the sixth audio signals.

14. The method of claim 11, wherein the first, second, third, fourth, fifth, sixth and seventh audio signals are analog signals.

15. The method of claim 11, wherein the first, second, third, fourth, fifth, sixth and seventh audio signals are each analog or digital signals.

16. The method of claim 11, wherein the sound producing device and the microphone are integral components of a headset.

17. The method of claim 11, wherein the recording device is a stenotype machine, the method further comprising synchronizing in near real time the seventh audio signal with typing on the stenotype machine.

18. An apparatus for recording a video conference, comprising:
- a computer having video conference capability, an audio input and an audio output;
- a mixer;
- a headset;
- a recording device connected to an output of the mixer;
- a first splitter connected as follows: (a) an input to an audio output of the computer, (b) a first output to the mixer, (c) a second output to headphone of the headset;
- a second splitter connected as follows: (a) an input to a microphone of the headset, (b) a first output to the mixer, and (c) a second output to the audio input of the computer;
- wherein the mixer is configured to (a) combine the audio output of the computer with the audio output of the microphone, and (b) output the combined audio to the recording device.

19. The apparatus of claim 18, wherein when the videoconference is active:
- the headset communicates with the computer through the first and second splitters, whereby the headset provides audio participation in the video conference; and
- the mixer outputs the combined audio feed of all participants to the video conference.

* * * * *